Dec. 20, 1966 D. L. RICHTER 3,293,364

SOUND SIGNAL CORRECTION SYSTEM

Filed April 8, 1963 2 Sheets-Sheet 1

INVENTOR.
DONALD L. RICHTER
BY Eugene M. Whitacre
ATTORNEY

Dec. 20, 1966 D. L. RICHTER 3,293,364

SOUND SIGNAL CORRECTION SYSTEM

Filed April 8, 1963 2 Sheets-Sheet 2

INVENTOR.
DONALD L. RICHTER

BY Eugene M. Whitacre

ATTORNEY

United States Patent Office 3,293,364
Patented Dec. 20, 1966

3,293,364
SOUND SIGNAL CORRECTION SYSTEM
Donald L. Richter, Bellmore, N.Y., assignor to Radio Corporation of America, a corporation of Delaware
Filed Apr. 8, 1963, Ser. No. 271,063
10 Claims. (Cl. 179—1)

The present invention relates to audio frequency sound signal recording and reproducing systems, and more particularly to dynamic spectrum equalizer systems wherein high level sounds from an original program source may be translated and reproduced at relatively low levels and yet maintain the same illusion of dynamic range and tonal balance as the original sound.

The well-known Fletcher-Munson curves show that the subjective loudness of any tone is a function not only of its intensity, but also of its frequency. Each of the individual Fletcher-Munson curves show the intensity of sound required at different frequencies across the audio frequency band to produce a sensation of equal loudness to an average listener. These curves are static in that they do not relate subjective loudness sensation to the actual intensity of the sound at any given frequency. For example, at a frequency of 1,000 cycles, the Fletcher-Munson curves are drawn with a substantially uniform separation of about 10 db in intensity level. However, the actual change in loudness sensation at 1,000 cycles is not linearly related to sound intensity. As used herein, the term loudness refers to the subject listener sensation and the term intensity refers to the actual measured level of the emitted sound.

In the recording and reproduction of sound signals, the dynamic loudness characteristic of the auditory sensation in the reproduction should be essentially the same as that of the original sounds as they were actually produced. This condition would be satisfied in a linear recording and reproducing system if the sound is reproduced at the same level as the original sounds. However, the sound level as recorded at a studio is ordinarily at a relatively high level, whereas the sound is ordinarily reproduced, in the home for example, at much lower levels.

With a linear recording and reproducing system, the relation of the actual sound intensity levels to that of the original signals would be preserved, but so far as the listener is concerned, the dynamic volume changes of the signal would be distorted. To illustrate, assume that the subjective loudness of the low, mid-range and high frequencies of a composite high level sound are simultaneously reduced by one-half, and that these sounds are linearly recorded at their actual intensity levels. If the sound is then reproduced at a much lower level, the subjective loudness over the frequency spectrum for the louder of the recorded signals can be balanced to conform to that of the recorded signal by appropriate frequency responsive equalizing networks. However, when the composite signal level drops off half, the subjective loudness over the frequency spectrum no longer corresponds to the original sound. For example, the low frequency and high frequency loudness will appear to have dropped by more than one-half, and the mid-range loudness will appear to have dropped by less than one-half.

Accordingly, it is an object of this invention to provide an improved dynamic spectrum equalization system for the correction of errors of this type and particularly for the translation of original program material at relatively high levels, which is to be reproduced at generally lower levels.

It is a further object of this invention to provide an improved recording system for disc phonograph records, magnetic tapes and the like which assures realistic dynamic volume perception of the original performance of the recorded material when played back at a lower level.

A dynamic spectrum equalization system embodying the invention includes a frequency equalization network having separate control means for adjusting the low and mid-range frequency response of the applied signal. The equalization network is coupled to receive high level program signals and includes separate control means automatically responsive to the signal level to adjust the response of the frequency equalization network. At low volume levels of program material the low frequency or bass control means is set to provide a desired maximum amount of boost for the low frequency portions of the program material, and the mid-range control means is static or inoperative. As the volume level of the program material increases, the control means for adjusting the low frequency response of the equalization network is operative to provide less low frequency boost, thereby effectively providing compression of the low frequency signals. At some medium volume level of program material the control means for adjusting the mid-range frequency response of the equalization network is rendered operative to boost the mid-range frequencies, thereby providing expansion for the mid-range signals. At the loudest volume level of the program material, the control means adjusting the low frequency response of the equalization network boosts the low frequencies very little if any, and the control means for adjusting the mid-range frequency response of the equalization network boosts that range of frequencies the desired maximum amount.

If desired, a further control means may be provided for controlling the high frequency response of the equalization network to roll off or attenuate the high frequencies at the loudest volume levels of program material to thereby provide compression thereof. The various control means are continuously and automatically variable throughout the volume range of the original program material permitting the reproduction of the original program material at a lower level with the illusion of the same dynamic range and tonal balance as the original program material.

The novel features which are considered to be characteristic of this invention are set forth with particularity in the appended claims. The invention itself, however, both to its organization and method of operation as well as additional objects and advantages thereof will best be understood from the following description when read in connection with the accompanying drawings in which:

Figure 1:
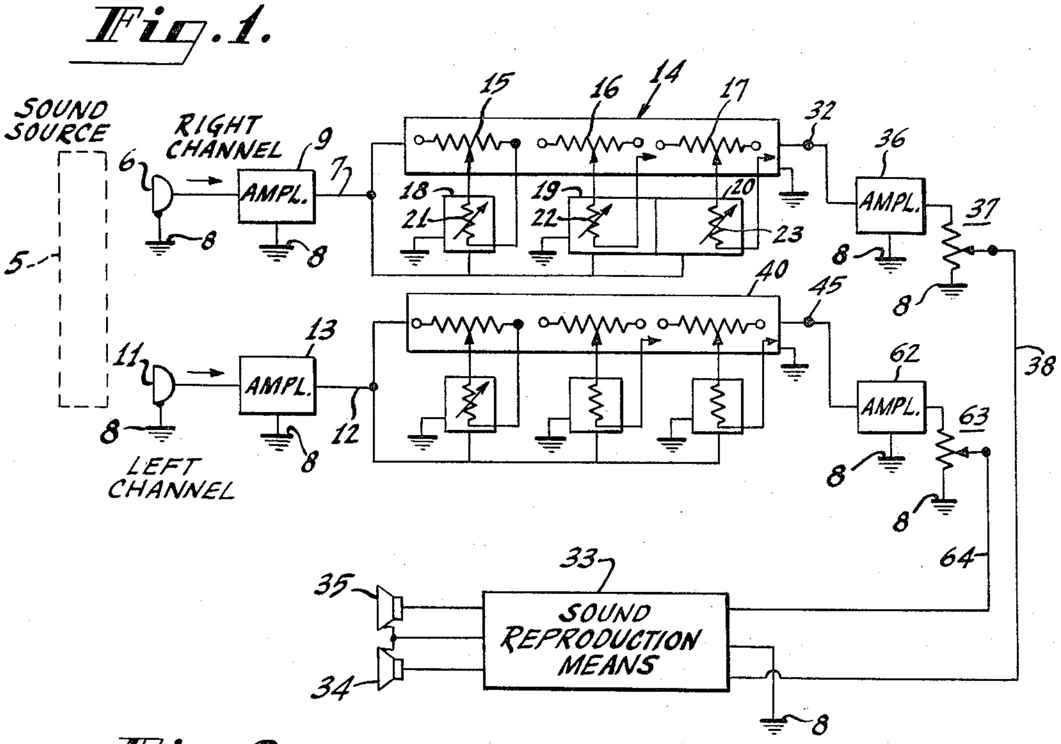
FIGURE 1 is a schematic circuit diagram, in block form, of a dynamic spectrum equalization system embodying the invention.

Referring to FIGURE 1, original program material from a relatively high-amplitude source such as an orchestra, indicated by the rectangular outline 5, is picked up by suitable means such as a microphone 6 connected to a signal translating channel having an input circuit represented by a signal conductor 7 and common or system ground 8, the conductor 7 being the high signal-potential side of the circuit and of the signal translating channel. A suitable audio-frequency amplifier 9 is connected between the microphone 6 and the circuit conductor 7 for suitably amplifying signals picked up by the microphone. The amplifier 9 may be connected with any other suitable source of audio-frequency signals representing sound pickup from a relatively high intensity source.

In the present example a dual-channel signal translating system is shown for stereophonic sound pickup and reproduction from the sound source 5. The second channel includes a second microphone 11 placed in spaced stereophonic relation to the first microphone in front of the sound source 5 as one of a stereophonically related pair of pickup devices. With this arrangement, the microphone 6 and its connected signal translating channel may be considered to be the right or (R) channel while the microphone 11 provides the input device for the left or (L) signal translating channel. The latter includes a channel input circuit having a conductor 12 connected with the microphone 11 through a second audio-frequency amplifier 13.

Referring to the right channel, the input circuit conductor 7 is connected to a frequency equalization network 14 which may, for example, comprise a Pultec Model EQP-1A equalizer manufactured by Pulse-Technique, Inc., 411 Palisades Avenue, West Englewood, New Jersey. The subject equalizer includes front panel controls for manually adjusting the frequency characteristics thereof.

One front panel control adjusts a potentiometer 15 which controls the low frequency boost characteristics of the equalizer. As the slider on the potentiometer 15 is moved to the right as shown in the drawings, the amount of low frequency boost is reduced. A second front panel control adjusts the potentiometer 16 which controls the mid-range frequency boost characteristics of the equalizer. As the slider on the potentiometer 16 is moved to the right, as shown in the drawing, the amount of mid-range frequency boost is increased. The third front panel control adjusts the potentiometer 17 which controls the high frequency attenuation characteristics of the equalizer. As the slider on the potentiometer 17 is moved to the right, as shown in the drawings, the amount of high frequency attenuation, or cut, is increased.

The input circuit conductor 7 is also coupled in common to the input circuits of three signal responsive variable resistance means 18, 19 and 20. By way of example, the signal responsive variable resistance means 18, may comprise a modified Fairchild compressor amplifier Model 663 manufactured by Fairchild Recording Equipment Corporation, 1040 45th Avenue, Long Island City 1, New York. The subject compressor amplifier essentially comprises an input circuit including thereacross a cadmium sulfide photocell whose resistance decreases as the light impinging thereon increases. Signals applied to the input circuit are amplified by a transistor amplifier, and applied to an output circuit which in the present case is terminated by a loading resistor of suitable value. A feed-back circuit from the amplifier output circuit is coupled to drive a light source in such a manner that the intensity of the light is a function of the signal amplitude. The light is directed onto the cadmium sulfide cell to modify the signal applied to the transistor amplifier.

For use with the dynamic spectrum equalizer of the invention, a second light responsive resistance element, such as a second cadmium sulfide cell is positioned to receive the signal modulated light from the light source. As represented in FIGURE 1 of the drawings, the signal responsive variable resistor is identified by the reference character 21, and is connected between the slider and the right-hand terminal (as shown in the drawings) of the potentiometer 15. Thus as signal amplitude increases the resistor 21 automatically decreases to decrease the amount of resistance between the slider and right end terminal of the potentiometer 15 to decrease the amount of low frequency or bass boost.

The second and third signal responsive variable resistance means 19 and 20 may comprise a single Fairchild Model 663 compressor amplifier except that two, rather than one light responsive cells shown as the signal responsive resistors 22 and 23 are added to the unit to receive light as a function of signal amplitude. Suitable delay means are provided by the transistor amplifier referred to so that the level at which the signal becomes effective to vary the resistors 22 and 23 may be controllably established. The signal responsive resistor 22 is connected in series with the slider of potentiometer 16 so that increases in signal amplitude, which produce a reduction in the resistance value of the resistor 22 increases the mid-range boost. In like manner the signal responsive resistor 23 is connected in series with the slider for the potentiometer 17, so that increases in signal level which produce a reduction in resistance value of the resistor 23, increases the treble or high frequency attenuation or cut.

The equalizer 14 is adjusted manually to provide a desired frequency response such that the maximum level of the original high level program material may be reproduced without tonal volume distortion at the maximum level at which the program level is to be reproduced. At the low volume levels of program material, the low frequency equalization network 14 provides the maximum desired boost for the low frequencies. The threshold level of the signal responsive variable resistor 21 is such that as the volume level of the program material increases, the resistance thereof starts to decrease, thus reducing the low frequency boost.

The threshold level for the signal responsive resistor 22 is set so that at some medium volume range of program material the resistance thereof starts to decrease, thus providing a boost or less attenuation for the mid-range frequencies. At the loudest volume levels of program materials, (1) the equalizer 14 is adjusted so that the low frequencies are boosted very little if any; (2) the resistor 22 adjusts the equalizer 14 to boost that range of maximum desired amount; and (3) the resistor 23 is activated to adjust the equalizer 14 to roll off or attenuate the high frequencies a desired amount.

In the circuit described, the effective threshold level of the signal responsive variable resistors 22 and 23 is different in that the resistance means 20 becomes operative at higher volume levels. This may be conveniently effected in the apparatus described since the potentiometer 16 comprises an 0–100K device and the potentiometer 17 comprises an 0–5K device.

For stereophonic systems, the left channel includes an equalizer 40 which is coupled to receive the program material from the amplifier 13. The equalizer 14 translates these signals on a frequency-amplitude basis in the manner described above with respect to the equalizer 14.

The signals from the two channels may be utilized either directly or indirectly in the reproduction of the derived sound through sound reproduction or utilization means 33 having sound translating loud speaker elements 34 and 35, for example. The utilization means is connected to the equalizer 14 output terminal 32 through suitable translating means such as an audio frequency amplifier 36, and channel output gain control means 37. The left (L) channel equalizer 40 has an output terminal 45 which is coupled at sound reproduction or utilization means 33 through suitable translating means such as an audio frequency amplifier 62, and a channel output gain control potentiometer 63. In some embodiments, the sound reproduction or utilization means 33 may be considered to include sound recording means from which is derived record material such as disc phonograph masters or magnetic tapes or the like. The utilization means, however, represents any suitable means for the translated and transformed signals and may provide for the recording and/or reproduction of these signals directly or indirectly.

Figure 2:
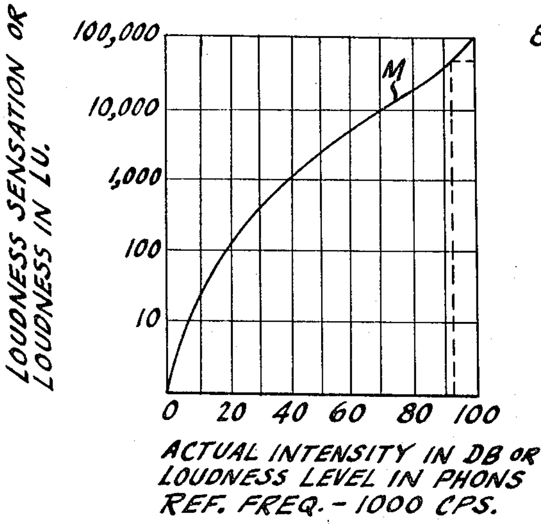
FIGURES 2, 3 and 4 are graphs showing curves illustrating certain frequency-response characteristics relating to the operation of the system of FIGURE 1.
Figure 3:
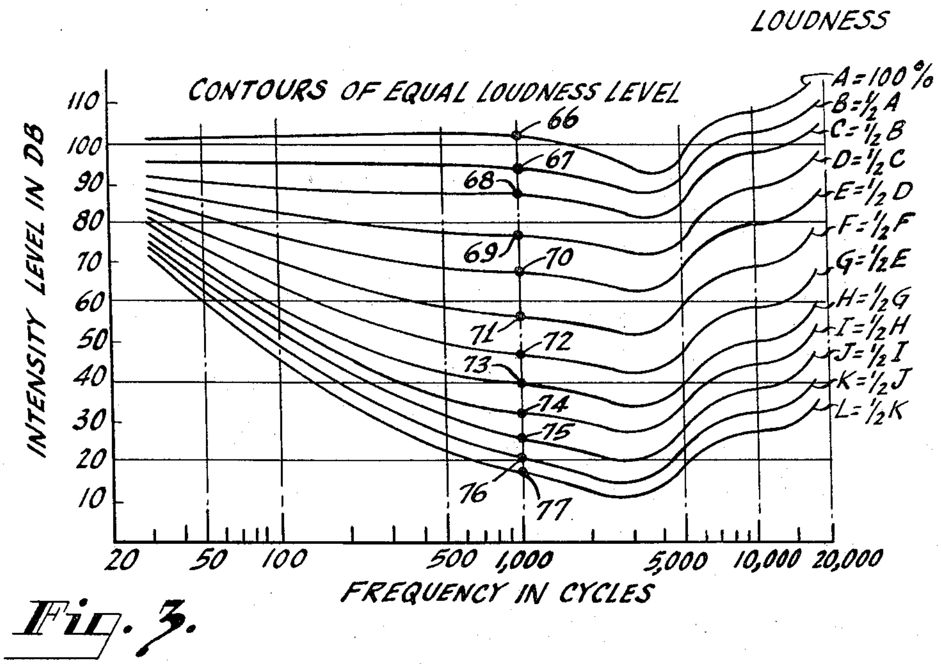

Since both signal translating (R) and (L) channels of the stereophonic system are substantially identical and either may be used independently in single channel applications, the following considerations of the operation of one channel will apply to both. However, before discussing the mode of operation of the dynamic spectrum equalizer circuits, attention is directed to the curves shown in the graphs of FIGURES 2, 3 and 4 which will be of assistance in further understanding the operation of the circuit of FIGURE 1. Referring particularly to FIGURES 2 and 3, the curve M in FIGURE 2 shows the relation between loudness, in loudness units from 1 to 100,000, and loudness level or intensity from zero to 100 db or phons, at a reference frequency of 1000 c.p.s. A similar curve is shown on page 827 of Radiotron Designers Handbook (Fourth Edition). From this curve and the Fletcher-Munson contours of equal loudness level, as shown on page 826 of the same reference, are derived the modified contours or curves of equal loudness level, A to L, as shown in FIGURE 3.

Assuming the contour A to represent 100% loudness according to Fletcher-Munson curves or 100,000 loudness units as shown in the curve of FIGURE 2, a set of successive half-loudness curves or contours may be drawn with respect thereto interpolated between the established contours and spaced along the 1000 cycle ordinate in accordance with half-loudness intensity changes in db. These changes in db are indicated by readings derived from the curve M of FIGURE 2, as indicated by the dotted-line coordinates for the drop in db from 100 as required for attaining a first half-loudness step from 100,000 to 50,000 units. Similarly, from 50,000 to 25,000 units, from 25,000 to 12,500 units, and so on, these half-loudness steps are derived in db for any required lower level, and are plotted along an ordinate from 1000 cycles on the frequency scale vertically in FIGURE 3. The plot points 66 to 77 for the curves or contours A to L respectively, are found to be substantially 8 db apart between points 66–67, 67–68, and 72–73, 10 db apart between points 68–69, 69–70 and 71–72, and 12 db apart between points 70 and 71.

These spacings thus indicate the drop in db in each step to provide half-loudness. Between the remaining plot points 73 to 77, along the 1000 cycle axis, the drop required for the successive half-loudness steps is 7, 6, 4 and 3 db, respectively. Thus the loudness along the curve B is half the loudness represented by the curve A. The loudness along the curve C is half the loudness represented by the curve B, and so forth, through to the curve L, as indicated by the legend under "Loudness" and on the graph of FIGURE 3.

This new set of equal loudness curves permits the determination of that change of amplitude or intensity level in db of sound when reproduced at lower levels required to impart the same sensation of loudness change on the hearing as the original high level program material. A family of curves may be derived, as shown in FIGURE 4, which show the level dependent equalization required to maintain the volume dynamics of the reproduced sound in the same proportions as that of the original sound.

Figure 4:
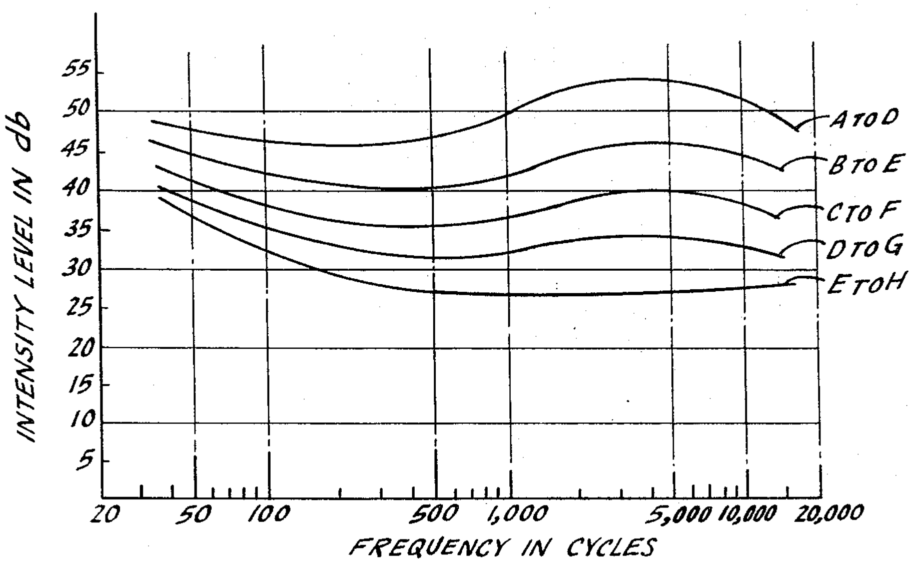

The derivation of the equalization curves as shown in FIGURE 4 is explained as follows. Assuming that a relatively high intensity program signal, correctly balanced on a frequency basis, and with sufficient dynamic range to cover the amplitude range indicated between the curves A and C of FIGURE 3 for example, is to be reproduced with a maximum loudness level at a somewhat reduced level such as that indicated by the curve D. As can be seen, the frequency response of the original curve A should be altered in such a manner as to conform with that represented by the curve D. This can be effected by the static original design or adjustment of the equalizer networks 14 and 40 of FIGURE 1.

The curve B which corresponds to a drop of half loudness from the original level A of the program source, should now be altered to conform with the characteristic indicated by the curve E, that is, half the loudness of the new maximum amplitude indicated by the curve D. From FIGURE 4 it can be seen that the actual intensity required to subjectively reduce the original loudness by one-half for a 1,000 cycle note is approximately 8 db. However for the same 1,000 cycle note, it can be seen that to reduce the new maximum loudness level of curve D by one-half, a change of intensity of approximately 10 db is required. This procedure is followed to determine the correction for any particular signal level. For example, the dynamic differences between the curves B and C of the original sound source at 1,000 cycles is about 7 db (the difference in the ordinate values for points 67 and 68) whereas the difference between the curves E and F of the reproduced sound (compare points 70 and 71) is 12 db. This indicates that in order to produce the same subjective changes in volume level in the reproduced sound as was heard in the original sound, the actual intensity changes of the original high level sound at 1000 cycles per second must be expanded prior to recording or playing back at lower levels.

The situation is different for low frequency or bass signals. To illustrate, the difference between the A and B curves representing the original sound is about 6 db at 50 cycles. However the difference between the D and E curves for the lower level reproduced sound is less than 3 db at the same frequency. The difference between the B and C curves is about 5 db and the difference between the E and F curves is about 2 db, both at 50 cycles. From the foregoing observations it will be seen that to reproduce the original high level program material at lower levels while maintaining the same low frequency volume dynamics, it is necessary to reduce or compress the changes in intensity of the low frequency or bass signals prior to recording or reproducing.

This procedure may be followed with respect to high frequency signals. It can be determined from the curves that for signals about 12,000 cycles of medium or low volume that no compression or expansion is required to preserve the volume dynamics. However at the higher volume levels of the reproduced sound, some compression is required to maintain the lower level reproduced signal in conformity with that of the original sound.

The desired level dependent equalization corresponding to the family of curves is produced by the dynamic spectrum equalizers 14 and 40 of FIGURE 1. With respect to the low frequency or bass signals, at the very highest volume level the bass equalization which is set by the potentiometer 15 boosts the bass very little if any. However, as the signal level drops an incremental amount, the resistance of the signal responsive resistor 21 increases, and additional bass boost is added. The effect of this action is to reduce the actual amplitude change (the dynamic or incremental change in db) of the low frequency signals thereby providing compression. As the low frequency signal level continues to drop, bass boost is added so that the db change in output signal from the equalizer is less than the db change in input signal to provide the dynamic compensation required.

At the highest reproduced levels of the program material, maximum mid-range boost or expansion is provided, and is controlled by the setting of the potentiometer 16. As the program level is reduced, the resistance of the signal level responsive resistor 22 increases thereby reducing the amount of mid-range frequency boost. This action increases the dynamic or incremental change in db. At some point corresponding to a medium volume level of program material, the threshold level of the resistor 22 is reached, and further reductions in program level produces no further reduction in the boost of the mid-range signal and no change in the dynamic characteristic. As shown in FIGURE 3, the curves G, H, I, etc. are more closely spaced in the mid-range area of the spectrum than curves D, E, F so that no further expansion relative to the original sound is required.

The high frequency equalization is controlled by signal responsive resistor 23 as noted above. It has been determined that, for the very highest level of reproduction, the high frequency signals, such as above 12,000 cycles, should be rolled off or attenuated to maintain the desired dynamic balance.

The net result of the dynamic spectrum equalizer is to provide in response to the original program material a variable frequency characteristic, so that the resultant signal when reproduced at low levels possesses the same dynamic volume characteristics as the original signal. ponderous. High level passages of the reproduced sound have more substance and texture without being heavy or pronderous. High level passages of the reproduced sound project with more intensity and more dynamic impact. This gives the listener a unique impression of the dynamic qualities of the music or other sound played back at levels other than those of the original program material.

Figure 5:
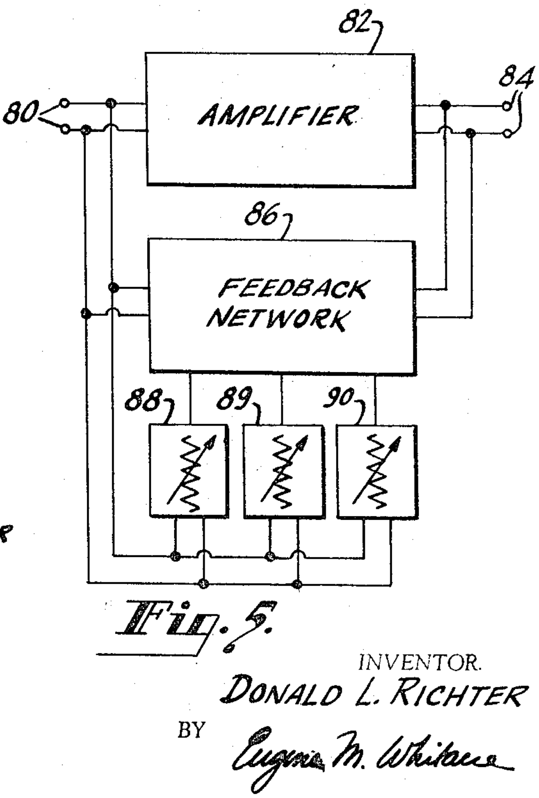
FIGURE 5 is a schematic circuit diagram, partly in block form, of another dynamic spectrum equalizer illustrating a modification of the invention.

Another embodiment of the invention is shown in the block diagram of FIGURE 5. FIGURE 5 includes a pair of input terminals 80 for connection to a suitable program signal source. An amplifier 82 coupled to the input terminal 80 amplifies signals applied thereto on a frequency selected basis, and applies the modified signals to a pair of output terminals 84. A frequency responsive feedback network 86 is coupled between the input terminals 80 and output terminals 84 to control the frequency translating characteristic of the amplifier as a function of the amplitude of the applied signals. By way of example, the feedback network includes a plurality of signal level responsive resistance means 88, 89 and 90 which may, for example, be of the same general type as those described in connection with FIGURE 1. The resistance means 88 is connected to a portion of the feedback circuit 86 adapted to control the low frequency feedback characteristics of the amplifier. Thus for low levels of applied program signals minimum negative feedback at low frequencies is provided by the network 86 so that maximum bass boost is effected. As the signal level increases and the resistance means 88 decreases, the amount of negative feedback at low frequencies is increased thereby providing a compressive effect on the applied low frequency signals.

For mid-range frequency signals, the feedback network is controlled by the resistance means 89. At low level of applied program signal substantial negative feedback is provided in the mid-frequency range. At some intermediate level of applied signals the resistance value of the resistance means 89 decreases, and as a result of the connections, the amount of negative feedback is reduced in the mid-frequency range thereby providing a boost or expansion at these frequencies.

The high frequency feedback is controlled by a signal level dependent variable resistance means 90. Ordinarily for low and medium volume levels of applied program material, the feedback network provides a negative feedback at high frequencies which is less than that at mid-range and more than that at low frequencies. The resistance means 90 is connected in the feed-back circuit in a manner to increase the amount of negative feed-back for relatively high level program signals.

What is claimed is:

1. In an audio frequency signal translating system for recording high level audio frequency signals in a manner that the dynamic loudness characteristics thereof are maintained when said signals are reproduced at low levels, the combination comprising, a signal input circuit for receiving high level audio frequency signals, and a signal output circuit for delivering a modified version of said audio frequency signals for recording, first means interconnected between said input and output circuits and responsive to the level of the high level audio frequency signals applied to said input circuit for compressing relatively low frequency components of said audio frequency signals applied to said input circuit, and second means interconnecting said input and output circuits and responsive to the level of the high level audio frequency signals applied to said input circuit for expanding mid-frequency range components of said audio frequency signals applied to said input circuit.

2. In an audio frequency translating system of the type defined by claim 1, third signal level responsive means interconnecting said input and output circuits for compressing high frequency components of the audio frequency signals applied to said input circuit.

3. In an audio frequency signal translating system for recording high level audio frequency signals, in a manner that the dynamic loudness chaarcteristics thereof are maintained when said signals are reproduced at low levels, the combination comprising, a signal input circuit for receiving high level audio frequency signals, and a signal output circuit for delivering a modified version of said original audio frequency signals for recording, first signal level responsive means interconnected between said input and output circuits for boosting the amplitude of and compressing the volume range of relatively low frequency components of the audio frequency signals applied to said input circuit, and second signal level responsive means interconnecting said input and output circuits for expanding the volume range of only those mid-frequency range components of the audio frequency signals applied to said input circuit which are of a level greater than an intermediate level between the highest and lowest levels of said mid-frequency range components.

4. In an audio frequency translating system of the type defined by claim 3, third signal level responsive means interconnecting said input and output circuits for compressing the volume range of only those high frequency components of the audio frequency signals applied to said input circuit which are substantially of the maximum level.

5. In a system for recording high level audio frequency signals in a manner that the dynamic loudness characteristics thereof are maintained in the same subjective proportionate relationship when the signals are reproduced at low levels, the combination comprising, a signal input circuit for receiving the high level audio frequency signals, and a signal output circuit for delivering a modified version of said audio frequency signals for recording, frequency responsive equalization means interconnected between said input and output circuits for providing individual control of the low frequency and mid-frequency range components of the audio frequency signals applied to said input circuit, said equalization means being adjusted to provide less attenuation for said low frequency components than for said mid-frequency range components for low levels of audio signals applied to said input circuit, first signal level responsive means coupled to said frequency responsive equalization means for automatically controlling the translation characteristics thereof for said low frequency components as a function of the level of the audio frequency signals applied to said input circuit so that more attenuation is provided for said low frequency components as the level of said audio frequency signals increase, second signal level responsive means coupled to said frequency responsive equalization means for automatically controlling the translation characteristics thereof for said mid-frequency range components as a function of the level of the audio frequency signals applied to said input circuit so that less attenuation is provided for said mid-frequency range components as the level of said audio frequency signals increase.

6. In a system as defined in claim 5, means for delaying the actuation of said second signal level responsive means relative to said first signal level responsive means as the level of the audio frequency signals applied to said input circuit increase.

7. In a system for recording high level audio frequency signals, the combination comprising, a signal input circuit receiving high level audio frequency signals, and a signal output circuit for delivering a modified version of said audio frequency signals for recording, frequency responsive equalization means interconnected between said input and output circuits for providing individual control of the low frequency, mid-frequency, and high frequency range components of the audio frequency signals applied to said input circuit, said equalization means being adjusted to provide a frequency translation characteristic so that the frequency versus subjective loudness characteristic of said high level audio frequency signals when reproduced at a predetermined lower level provides the same auditory sensation on a frequency basis as the original audio frequency signals, first signal level responsive means coupled to said frequency responsive equalization means for automatically controlling the translation characteristics thereof for said low frequency components as a function of the level of the audio frequency signals applied to said input circuit so that more attenuation is provided for said low frequency components as the level of said audio frequency signals increase, second signal level responsive means coupled to said frequency responsive equalization means for automatically controlling the translation characteristics thereof for said mid-frequency range components as a function of the level of the audio frequency signals applied to said input circuit so that less attenuation is provided for said mid-frequency components as the level of said audio frequency signals increases, third signal level responsive means coupled to said frequency responsive equalization means for automatically controlling the translation characteristics for said high frequency components as a function of the level of the audio frequency signals applied to said input circuit so that more attenuation is provided for said high frequency range components as the level of said audio frequency signals increases.

8. In a system as defined in claim 7, means for delaying the actuation of said second signal level responsive means relative to said first signal level responsive means as the level of audio frequency signals applied to said input circuit increases from a predetermined minimum value, and for delaying the actuation of said third signal level responsive means relative to said second signal level responsive means as the level of the audio frequency signals as applied to said input circuit is further increased.

9. In a system for recording high level audio frequency signals in a manner that the dynamic loudness characteristics thereof are maintained in the same subjective proportionate relationship when the signals are reproduced at low levels, the combination comprising, a signal input circuit for receiving the high level audio frequency signals, and a signal output circuit for delivering a modified version of said audio frequency signals for recording, an amplifier connected between said input and output circuit, means providing a frequency responsive feedback network for said amplifier, said feedback network providing individual control of the low frequency and mid-frequency range components of the audio frequency signals applied thereto and adjusted to provide an overall frequency response characteristic for said amplifier so that the output signals therefrom may be reproduced at a level lower than said original audio frequency signals with the same apparent volume relationship on a frequency basis, first signal level responsive means coupled to said frequency responsive feedback network for increasing the amount of feedback in the negative direction for said low frequency components as the level of said audio frequency signals applied to said input circuit increases, second signal level responsive means coupled to said frequency responsive feedback network for decreasing the amount of feedback in a negative direction for said mid-frequency range components as the level of the audio frequency signal applied to said input circuit increases.

10. In a system of the type defined in claim 9, means for delaying the actuation of said second responsive means relative to the actuation of the first signal responsive means as the level of the audio frequency signal applied to said input circuit increases above a predetermined minimum level.

References Cited by the Examiner

UNITED STATES PATENTS 3,229,038 1/1966 Richter ------------ 179—1.2

KATHLEEN H. CLAFFY, *Primary Examiner.*

R. MURRAY, *Assistant Examiner.*